United States Patent Office 3,842,042
Patented Oct. 15, 1974

3,842,042
FILM FORMING POLYURETHANES
John C. Wilson and Frederick Hamb, Rochester, N.Y., assignors to Eastman Kodak Company, Rochester, N.Y.
No Drawing. Original application Nov. 1, 1971, Ser. No. 194,506, now Patent No. 3,769,264. Divided and this application Mar. 28, 1973, Ser. No. 345,623
Int. Cl. C08g 22/16
U.S. Cl. 260—77.5 AP
5 Claims

ABSTRACT OF THE DISCLOSURE

A composition of matter comprising a polymer having the structure:

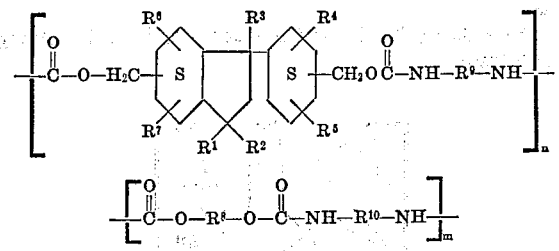

wherein $n$ is less than or equal to 1; $m$ is 1 minus $n$; $R^1$ and $R^3$ are hydroxy or alkyl; $R^2$ is alkyl; $R^4$ to $R^7$ are selected from the group consisting of hydrogen, aryl, halogen, nitro, cyano, amino and alkoxy; $R^8$ to $R^{10}$ are selected from the group consisting of alkylene, arylene, arylenebisalkylene, cycloalkylene, alkylenebisarylene, alkylidenebisarylene, arylenealkylene, units having the formula:

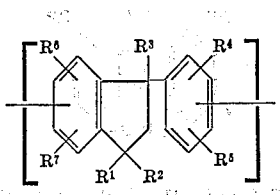

and units having the formula:

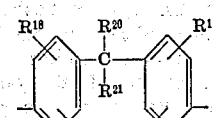

wherein $R^{18}$ and $R^{19}$ are hydrogen, aryl, halogen, nitro, amino, cyano and alkoxy; and $R^{20}$ and $R^{21}$ are hydrogen, alkyl, cycloalkyl, aryl, and when $R^{20}$ and $R^{21}$ are taken together with the carbon atom to which they are attached, they can represent a monocyclic, polycyclic or heterocyclic moiety having from 4 to 15 atoms in the ring.

BACKGROUND OF THE INVENTION

This is a division of application Ser. No. 194,506, filed Nov. 1, 1971, now U.S. Pat. 3,769,264 issued Oct. 30, 1973.

Field of the Invention

This invention relates to polymers containing substituted and unsubstituted 3-(4-cyclohexylene)hexahydroindan-5-yl units and to the preparation of these polymers.

DESCRIPTION OF THE PRIOR ART

There is a continuing demand for low cost film-forming materials with improved physical properties which can be used as supports for photographic elements. Many of the currently available film-forming compositions that exhibit good physical characteristics are commercially unattractive owing to the cost of the component ingredients or the difficulty of the manufacturing conditions.

The compound 1,1,3-trimethyl-5-carboxy-3-(4-carboxyphenyl)indan is a commercially available material, generally referred to as phenylindan dicarboxylic acid or, abbreviated PIDA. Means for the preparation of PIDA have been disclosed by Petropoulous in, for example, U.S. 2,780,609; U.S. 2,830,966, U.S. 2,873,262 and U.S. 3,102,135. U.S. 2,780,609 describes the use of PIDA as a plasticizer for vinyl chloride polymers. U.S. 2,830,966 relates to polyester resin compositions comprising an unsaturated polyester resin and a polymerizible compound containing a vinylidene group, wherein the polyester resin is prepared by reacting a polyhydric alcohol with an alpha, beta-unsaturated polycarboxylic acid and PIDA. U.S. 2,873,262 relates to a process for preparing alkyd resins comprising reacting a polyhydric alcohol with PIDA. U.S. 3,102,135 describes a process for the preparation of PIDA.

Copolyesters of PIDA with terephthalic acid and ethylene glycol have been described in Belgian 731,258 and Netherlands 69,05547 and its reaction with bisphenols has been described by Hamb in Belgian 748,510.

Preparation and uses for 1-(hydroxyphenyl)indanols are described in U.S. 2,754,285, U.S. 2,819,249 and U.S. 2,979,534.

Diisocyanatoindans and diisothiocyanatoindans and polymers prepared therefrom are described in U.S. 2,855,385 and U.S. 2,855,420.

U.S. 3,539,619 to Steitz describes 1,1,3-trimethyl-3-cyclohexylindane-4',5-dicarboxylic acid, its acid chloride and its lower alkyl esters. The patent states that this acid has utility in the preparation of polyamides and polyesters.

SUMMARY OF THE INVENTION

In accordance with the present invention, a composition of matter is provided comprising a polymer having the structure:

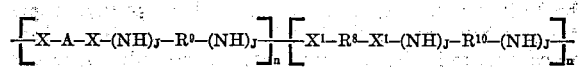

wherein:
A is

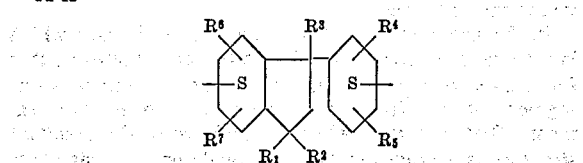

$n$ is a mole fraction and is a positive number less than or equal to 1;
$m$ is a mole fraction and equals $1-n$;
$R^1$ and $R^3$ are independently selected from the group consisting of hydrogen and alkyl radicals of from one to six carbon atoms;
$R^2$ is an alkyl radical of from one to six carbon atoms;
$R^4$, $R^5$, $R^6$ and $R^7$ are independently selected from the group consisting of hydrogen, aryl radicals, halogen atoms, nitro radicals, cyano radicals, amino radicals and alkoxy radicals;
$R^8$, $R^9$ and $R^{10}$ are independently selected aliphatic or aromatic radicals;
J is an integer and equal to zero or one;
and —X—A—X— and —X¹—R⁸—X¹— interdependently related according to the following schedule:

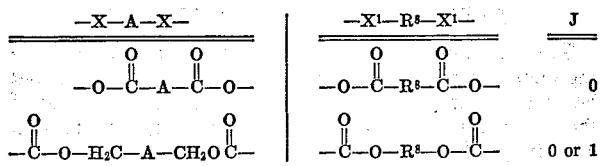

The polymers are useful in the manufacture of fibers, lacquers, adhesives, molding resins, sheets, engineering plastics or subbing layers. In particular, these polymers are useful as photographic film supports.

DESCRIPTION OF THE PREFERRED EMBODIMENTS

As stated above, the novel polymers of this invention comprise the following structure:

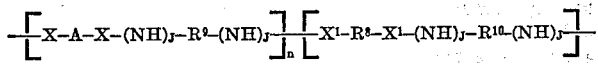

wherein:
A is

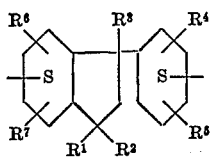

These polymers are polyesters, polyurethanes or mixtures wherein both ester and urethane moieties are present in the same polymer chain.

As used herein, $n$ is a mole fraction and is a positive number less than or equal to 1. Similarly, $m$ is a mole fraction and is equal to $1-n$. It is preferred that $n$ have a value in the range of about 0.15 to about 1.0. $R^1$ and $R^3$ are each either hydrogen atoms or lower alkyl radicals of from one to six carbon atoms such as methyl, ethyl, propyl, butyl, pentyl, hexyl and isomers thereof. It is preferred that where $R^1$ and $R^3$ are alkyl radicals, they be methyl radicals. $R^2$ is an alkyl radical of from one to six carbon atoms such as those described for $R^1$ and $R^3$ and is preferably a methyl radical.

$R^4$, $R^5$, $R^6$ and $R^7$ are independently selected and can be hydrogen atoms, aryl radicals such as phenyl, naphthyl, anthryl, phenanthryl and the like, including substituted aryl radicals, halogen atoms, nitro radicals, amino radicals, cyano radicals, alkoxy radicals and the like, wherein the substituents on the substituted aryls are limited to the above radicals.

In the above structural formula, J is an integer which is their zero or one. It will be understood, however, that for a given polymer chain, J can be equal to zero in one segment of the chain and equal to one in another segment. That is to say when J equals zero, the resultant structure is a polyester; when J equals one, the structure is a polyurethane and where the polymer is a mixture of polyester and polyurethane units, J will be zero for the ester units and one for the urethane units. X and $X^1$ are chosen from one of the combinations of the following schedule:

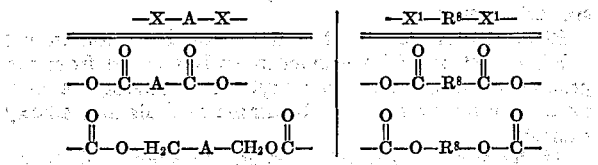

$R^8$, $R^9$ and $R^{10}$ are independently selected aliphatic or aromatic radicals. More specifically, $R^8$, $R^9$ and $R^{10}$ can be radicals selected from the group consisting of alkylene radicals of from 2 to 10 carbon atoms, such ethylene, tetramethylene, pentamethylene, octamethylene, nonamethylene and the like; arylene radicals, such as o-, m-, or p-phenylene, naphthalenediyl, or anthracenediyl, unsubstituted or substituted with radicals such as halogen, nitro, cyano, alkyl of 1 to 6 carbon atoms or alkoxy of 1 to 6 carbon atoms; arylenebisalkylene radicals wherein the alkylene portion has 1 to 6 carbon atoms, such as phenylenedimethylene, phenylenediethylene, naphthalenediyldimethylene, naphthalenediyldiethylene and the like; cycloalkylene radicals, such as cyclopentylene, cyclohexylene, norbornanediyl; alkylenebisarylene radicals where the alkylene portion contains 1 to 12 carbon atoms, such as ethylene, trimethylene, hexamethylene, decamethylene, dodecamethylene, and the arylene portion is as defined above; alkylidenebisarylene radicals where the alkylidene portion contains 1 to 12 carbon atoms, such as ethylidene, allylidene, hexylidene and the like; and the arylene portion is as defined above; and arylenealkylene radicals where the arylene and alkylene portions are as defined above.

The radicals $R^8$, $R^9$ and $R^{10}$ can also be units having the formula:

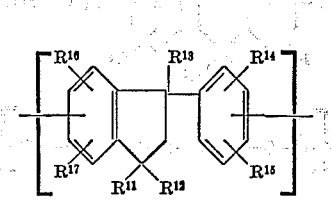

wherein $R^{11}$, $R^{12}$, $R^{13}$, $R^{14}$, $R^{15}$, $R^{16}$ and $R^{17}$ are independently selected from among those atoms and radicals described above as being suitable embodiments of $R^1$, $R^2$, $R^3$, $R^4$, $R^5$, $R^6$ and $R^7$, respectively.

$R^8$, $R^9$ and $R^{10}$ can also be represented by the formula:

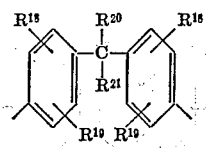

wherein each $R^{18}$ and $R^{19}$, which can be the same or different, is selected from the group consisting of hydrogen atoms, aryl radicals, such as phenyl, including substituted phenyl, halogen atoms, nitro radicals, amino radicals, cyano radicals, alkoxy radicals and the like, and wherein the substituents on the phenyl radical may be a halogen atom, nitro radical, amino radical, cyano radical, or alkoxy radical. $R^{20}$ and $R^{21}$ represent aliphatic monocyclic or bicyclic radicals or can each be hydrogen atoms, alkyl radicals of from 1 to 6 carbon atoms, including substituted alkyl radicals, such as fluoromethyl, difluoromethyl, trifluoromethyl, dichlorofluoromethyl, 2-[2,3,4,5-tetrahydro-2,2-dimethyl-4-oxofur-3-yl]ethyl and the like; cycloalkyl radicals of from 4 to 6 carbon atoms, such as cyclohexyl; and aromatic radicals having from 6 to 20 carbon atoms, such as phenyl, 3,4-dichlorophenyl, 2,4-dichlorophenyl. $R^{20}$ and $R^{21}$ taken together with the carbon atom to which they are attached can represent a monocyclic, polycyclic, or heterocyclic moiety having from 4 to 15 atoms in the ring system.

The fundamental condensants from which the polymers of this invention are prepared have the following structure:

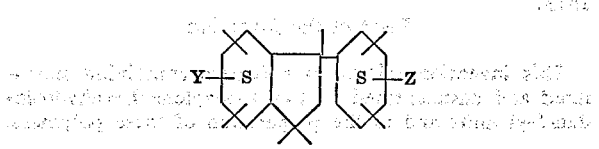

wherein Y and Z are independently selected from the group consisting of —CH₂OH, —COOH, carboxylic acid halides and —COOR wherein R is a lower alkyl radical of from 1 to 8 carbon atoms. Substitution at the several points indicated will correspond to that set forth above in the description of the polymers. It is preferred that the structure of these condensants be:

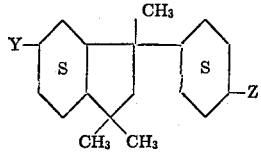

and most preferred that Y and Z be identical and be either hydroxymethyl or carbomethoxy.

Where Y and Z are hydroxymethyl, they will generally be reacted with dicarboxylic acids or derivatives thereof.

Dicarboxylic acids which can be employed to advantage in preparing polyesters from the dihydroxymethyl compounds of this invention include succinic acid, glutaric acid, adipic acid, pimelic acid, azelaic acid, sebacic acid, 2-methyladipic acid, diglycolic acid thiodiglycolic acid, fumaric acid, cyclohexane-1,3-dicarboxylic acid, cyclohexane-1,4-dicarboxylic acid, cyclopentane-1,3-dicarboxylic acid, 2,5-norbornanedicarboxylic acid, (the above-described acids being useful either as the cis or trans form), phthalic acid, isophthalic acid, terephthalic acid, t-butyl-isophthalic acid, phenylenediacetic acid, phenylenedipropionic acid, 2,6-naphthalenedicarboxylic acid, 1,4-naphthalenedicarboxylic acid, 1,5 - naphthalenedicarboxylic acid, 1,7-naphthalenedicarboxylic acid, 4,4'-diphenic acid, 4,4'-sulfonyldibenzoic acid, 4,4'-oxydibenzoic acid, binaphthyldicarboxylic acid, 4,4'-stilbenedicarboxylic acid and 9,10-triptycenedicarboxylic acid.

Although the dicarboxylic acids useful in the practice of this invention can be employed in the free acid form, it is often more advantageous to utilize a bifunctional derivative. For example, the corresponding acid anhydrides may be used where they are available. Other useful bifunctional equivalents include the lower monohydric alcohol or phenyl esters of dicarboxylic acids and the dicarboxylic acid halides, e.g., the chlorides or bromides.

Where the polyurethanes of this invention are to be prepared from the di-hydroxymethyl derivatives described above, this will generally be accomplished by reaction with diisocyanates. As exemplary of some of the diisocyanates which may be employed for this purpose may be listed: hexamethylene diisocyanate, methylenedi-p-phenyl diisocyanate, 3,3'-dimethoxy-4,4'-biphenyl diisocyanate and tolylene-2,4-diisocyanate and the like.

Where Y and Z of the above structural formula are —COOH, carboxylic acid halide or —COOR and the polyesters of this invention are the desired end product, these materials will generally be reacted with bisphenols, monocyclic and polycyclic diols and alkylene glycols. The bisphenols employed in this invention are generally of the structure:

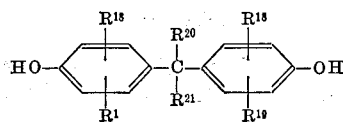

wherein R¹⁸, R¹⁹, R²⁰ and R²¹ are as defined hereinbefore.

Typical useful bisphenols include:

Bisphenol A;
2,2-bis(4-hydroxy-3,5-dichlorophenyl)propane [tetrachlorobisphenol A];
1-phenyl-1,1-bis(4-hydroxyphenyl)ethane;
1-(3,4-dichlorophenyl)-1,1-bis(4-hydroxyphenyl)ethane;
2,2-bis-(4-hydroxyphenyl)-4-[3-(2,3,4,5-tetrahydro-2,2-dimethyl-4-oxofuryl)]butane;
bis(4-hydroxyphenyl)methane;
2,4-dichlorophenylbis(4-hydroxyphenyl)methane;
1,1-bis(4-hydroxyphenyl)cyclohexane;
1,1,1,3,3,3-hexafluoro-2,2-bis(4-hydroxyphenyl)propane;
diphenylbis(4-hydroxyphenyl)methane.

Other useful bisphenols include
1,4-naphthalenediol,
2,5-naphthalene diol,
bis(4-hydroxy-2-methyl-3-propylphenyl)methane,
1,1-bis(2-ethyl-4-hydroxy-5-sec.-butylphenyl)ethane,
2,2-bis(4-hydroxyphenyl)propane,
2,2-bis(4-hydroxy-2-methyl-5-*tert.*-butylphenyl)propane,
1,1-bis(4-hydroxy-2-methyl-5-isooctylphenyl)isobutane,
bis-(2-ethyl-4-hydroxyphenyl)-4,4-di-p-tolylmethane.

Still other useful bisphenols are disclosed in U.S. Pat. 3,030,335 and Canadian Pat. 576,491.

Typical monocyclic diols include hydroquinone and hydroquinones substituted with alkyl groups of 1 to 15 carbon atoms, or halogen atoms, resorcinol, unsubstituted or substituted with lower alkyl groups or halogen atoms, and the like, 1,4-cyclohexanediol, 1,4-cyclohexanedimethanol, 1,4-cyclohexanediethanol, 1,4-bis(2-hydroxyethoxy)-cyclohexane, 1,4 - benzenedimethanol, 1,4 - benzenediethanol and the like.

Illustrative examples of polyalicyclic diols include norbornylene glycol, decahydro - 2,6 - naphthalenedimethanol and the compounds listed in Table I of U.S. Pat. 3,317,466 under the heading of "Bisphenols."

Exemplary alkylene glycols include ethylene glycol, diethylene glycol, triethylene glycol, 1,2-propanediol, 1,3-propanediol, 1,4-butanediol, 2,3-butanediol, 1,5-pentanediol, 1,6-hexanediol, 1,7-heptanediol, 1,8-octanediol, 1,9-nonanediol, 1,10-decanediol, 1,12-dodecanediol, neopentyl glycol, 2,2,4-trimethyl-1,6-hexanediol, and 4-oxa-2,6-heptanediol.

The polyurethanes of this invention can also be prepared by reacting the bischloroformate derivatives of the diol with diamines. As exemplary of some of the diamines that may be employed to prepare these polyurethanes may be listed: 1,4-butanediamine; 1,4-cyclohexanebis(methylamine); 1,8 - methanediamine; 1,2 - propanediamine; 1,3-propanediamine and the like.

The molecular weight of the linear condensation polymers of this invention can vary over wide ranges; it has been found that polymers having a molecular weight of at least about 10,000 are useful. Compounds having a molecular weight from about 30,000 to 100,000 are particularly desirable. The compounds of this invention are further characterized by their inherent viscosities. Generally, the subject film-forming polymers have an inherent viscosity of about 0.1 to about 0.8 and the polymers preferred as supports for photographic elements have an inherent viscosity of about 0.5 to about 0.8. The inherent viscosities are measured at 25° C. in 1:1 (by wt.) phenol: chlorobenzene at a concentration of 0.25 g. of polymer per 100 ml. of solution unless otherwise specified.

The glass transition temperatures of the polymers of this invention can be determined by differential scanning calorimetry as disclosed in "The DSC Cell and Accessories Instruction Manual for the 900 Thermal Analyzer and Modules," sold by E. I. Du Pont de Nemours Instrument Products Division.

"Film-forming" as used in this invention refers to a material which will provide a self-supporting film of the material when cast or extruded, for example, when cast in sheets of from 1 to 7 mils thickness.

It is appreciated, of course, that the physical properties of the broad class of polymers of this invention, such as, for example, the glass transition temperature (Tg), yield strength, break strength, Young's modulus and the like, can be varied over a wide range. Polymers with properties in a particular range can be easily obtained by judicious selection of appropriate monomeric components and suitable mixtures thereof. The proper choice and proportions of the monomeric components can be determined by test procedures well-known to those skilled in the art of making condensation polymers.

As indicated in the general formula set out hereinabove, the linear condensation polymers of this invention include polyesters, polyurethanes and mixed polyester-polyurethanes. Generally, any procedure known in the art for making linear condensation polymers can be used in preparing the polymers of this invention. The following are examples of processes that may be utilized to produce the linear polymers of this invention.

(a) The interfacial procedure can be utilized to make the polymers, for example, by reacting the diacid chlorides with bisphenols or converting the diols to the bischloroformates and reacting them with diamines. The preferred time of reaction is a function of all other variables and, as such, is governed by the viscosity desired for the polymer. Generally, the reaction can be monitored by sampling and thus the preferred polymerization time chosen. A variety of solvents may be employed to provide a broad range of temperatures and solubilities as desired. Suitable solvents include the chlorinated hydrocarbons such as, for example, chloroform, dichloroethane, propylene dichloride, dichlorobenzene and the like.

(b) Polymers, according to this invention, can be prepared by a solution procedure whereby the reactants are placed in solution in the presence of a solvent, such as, for example, chlorobenzene and a suitable catalyst, e.g., dibutyl tin oxide.

(c) The ester interchange procedure of synthesizing polymeric esters both by the melt process and the powder process can advantageously be used to make the polyesters of this invention, in particular, the powder process can be used advantageously when the first stage polymers can be crystallized. In a preferred embodiment, these techniques may be used in combination with a solvent crystallization step to afford film-forming polyesters having improved physical properties. The solvent crystallization procedure generally involves contacting melt process polymer with a solvent at ambient temperatures. Suitable solvents include acetone, 2-pentanone, ethyl acetate, acetic acid, toluene and the like. The treated material is separated from the solvent by any conventional procedure and put through the powder process. The melt process is advantageously conducted in the presence of a catalytic agent. Useful catalysts for the transesterification reactions include the carbonate, oxide, hydroxide, hydride and alkoxide of an alkali metal or an alkaline earth metal, a compound of a Group IVA metal of the Periodic Table, e.g., titanium isopropoxide, organometallic halides and complex alkoxides such as $$NaHTi(OC_4H_9)_2$$

and the like.

The film-forming materials of this invention can be generally extruded or cast into flexible supports and used in various layer arrangements and structural combinations. Generally, the flexible supports prepared from the polymers of this invention are treated by any convenient method to improve the adhesion of superimposed coatings or layers. Useful procedures include subbing with conventional subbing agents for polymer supports, contacting with a chemical agent such as sulfuric acid, electron bombardment, and the like. The film-forming polymers of this invention are used to advantage as flexible supports for photographic silver halide and other light-sensitive systems as well as for multi-layer elements used in color photography and diffusion transfer processes.

The following examples are included for a further understanding of the invention. It should be understood that where equations are given, they represent the overall reaction described in the particular example without regard to possible mechanism.

EXAMPLE 1

Synthesis of 1,1,3-Trimethyl-3-(4-chabomethoxycyclohexyl)-5-carbomethoxyhexadhydroindan In a pressure reactor were placed 1000 g. (2.84 mole) of 1,1,3-trimethyl - 3 - (4-carbomethoxyphenyl)-5-carbomethoxyindan 7.0 liters of dioxane and 20 g. of palladium on carbon catalyst. The reactor was then charged with 2500 p.s.i. of hydrogen at room temperature. The mixture was heated to 250° C. over a 7.0-hour period. The reactor was cooled overnight. Fifty grams of additional palladium on carbon were added and the reactor was recharged with hydrogen to 2500 p.s.i. at room temperature and heated to 250° C. over a 5.5-hour period. The reactor was cooled again overnight, and the mixture was filtered. To the filtrate was added 50 g. of palladium on carbon catalyst. The reactor was charged with hydrogen to 2500 p.s.i. at room temperature and heated to 250° C. over a 5.5-hour period. The reaction mixture was cooled, filtered, and the filtrate was concentrated. Part of the residue (750 g.) was further reduced as shown in Example 2. The balance of the residue was then distilled through a Vigreaux column. Four cuts were taken during the distillation as shown below in Table I.

TABLE I

| Fraction: | Pot temperature (° C.) | Head temperature (° C.) | Pressure (mm.) | Volume (ml.) |
| --- | --- | --- | --- | --- |
| 1 | 212–226 | 160–198 | 0.50–0.60 | 30 |
| 2 | 228–240 | 198–203 | 0.60–0.70 | 70 |
| 3 | 241–253 | 204–224 | 0.60–2.00 | 50 |
| 4 | | 228–246 | 1.00–1.40 | 15 |

An Nmr spectrum of Fraction 3 was in agreement with the proposed structure. An elemental anaylsis of Fraction 3 gave the following:

Anal. Calcd. for $C_{22}H_{36}O_4$: C, 72.49; H, 9.95; M. Wt., 364.5 g. Found: C, 72.3; H, 9.7; M. Wt., 340 g.

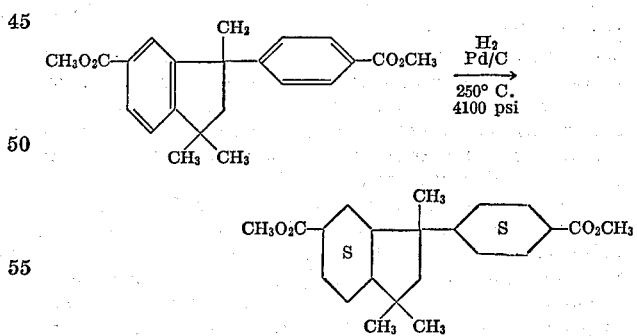

EXAMPLE 2

Synthesis of 1,1,3-Trimethyl-3-(4-hydroxymethylcyclohexyl)-5-hydroxymethylhexahydroindan 1,1,3 - Trimethyl - 3 - (4 - carbomethoxycyclohexyl)-5-carbomethoxyhexahydroindan (750 g. from Example 1 crude), 800 ml. of dioxane and 75 g. of copper chromite were charged with 2500 p.s.i. of hydrogen at room temperature. The temperature was raised to 200° C. and maintained for 40.7 hours. The mixture was cooled, filtered and concentrated. An infrared examination of the crude residue exhibited strong carbonyl absorption. This residue was therefore taken up in dioxane again and treated with 75 g. of copper chromite and 2500 p.s.i. of hydrogen (room-temperature measurement). This mixture was heated for 12.7 hours at 250° C. and cooled. The mixture was filtered and concentrated. All but 31 g. was distilled through a six-inch Vigreaux column giving 214 g. of 1,1,3 - trimethyl - 3 - (4-hydroxymethylcyclohexyl)-5-hydroxymethyl hexahydroindan; bp=220° C./0.10 mm. Nmr, infrared and mass spectral data were in agreement with the proposed structure. An elemental analysis gave the following results:

Anal. Calcd. for $C_{20}H_{36}O_2$: C, 77.87; H, 11.76. Found: C, 78.1; H, 11.6.

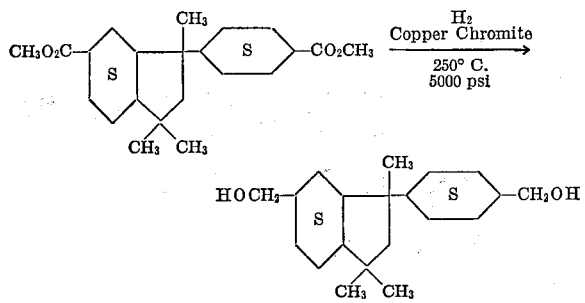

If desired, the corresponding dicarboxylic acids, acid chlorides, amides and the like can be prepared from the compound of Example 1 by any of the methods well-known to those skilled in the art. The dicarboxylic acid can also be prepared by the hydrogenation of 1,1,3-trimethyl-5-carboxy-3(4-carboxyphenyl)indan in the presence of palladium on carbon catalyst.

EXAMPLE 3

Polymerization of 1,1,3-Trimethyl - 3 - (4-carbomethoxycyclohexyl) - 5 - carbomethoxyhexyahydroindan and Ethylene Glycol In a polymer flask equipped with a Vigreaux-Claissen adapter and nitrogen inlet tube were placed 27.5 g. (0.0755 mole) of 1,1,3-trimethyl-3-(4-carbomethoxycyclohexy)-5-carbomethoxyhexahydroindan, 7.95 g. (0.128 mole) of ethylene glycol and a catalytic amount of zinc acetate dihydrate and antimony (III) oxide. The mixture was heated at 245° C. for 1.6 hours with nitrogen bubbling. Five drops of titanium tetraisopropoxide was added and the mixture was heated at 245° C. for an additional 2.8 hours. At this time nitrogen addition was terminated, stirring was begun and the flask was placed under an 80-micron vaccum. The temperature was then gradually raised to 300° C. over a 1.2-hour period. The light amber polymer was then cooled and isolated. It was soluble in methylene chloride and chloroform on standing for 64 hours at 25° C. The inherent viscosity was measured in a 1:1 (weight) phenol:chlorobenzene solution at a concentration of 0.25 g./100 ml. at 250° C. and found to be 0.23. The glass transition temperature (Tg) was determined at a heating rate of 10° C./min. with a DuPont 900 Differential Scanning Calorimeter and found to be 91° C.

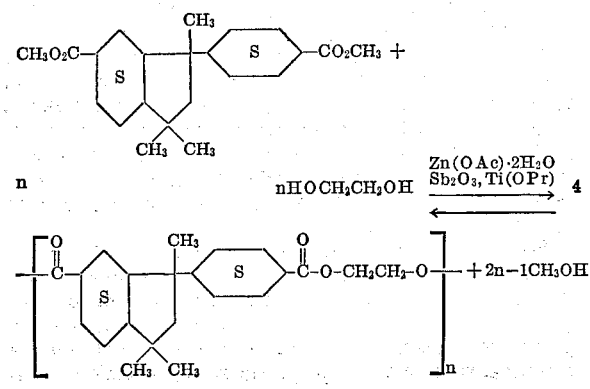

EXAMPLE 4

Example 3 was repeated except that 1,4-cyclohexanedimethanol was substituted for the ethylene glycol employed therein. The inherent viscosity of the polymer so formed was 0.34 and the glass transition temperature was 113° C.

EXAMPLE 5

Polymerization of 1,1,3-Trimethyl-3-(4-hydroxymethylcyclohexyl)-5-hydroxymethylhexahydroindan and Dimethyl Terephthalate In a 50 ml. polymer flask equipped with a Vigreaux-Claissen adapter, and a nitrogen inlet tube were placed 15.4 g. (0.05 mole) of 1,1,3-trimethyl-3-(4-hydroxymethylcyclohexyl)15 1hydroxymethylhexahydroindan, 9.7 g. (0.05 mole) of dimethyl terephthalate and a catalytic amount of dibutyl tin oxide. Over a 2.3-hour period, the mixture was heated with nitrogen bubbling from 220° C. to 276° C. The inlet tube was removed and with stirring, the pressure was reduced to 0.10–0.40 mm. This pressure and stirring were maintained at 273° C. for 2.5 hours. The polymer was then isolated as a grey-amber material. The inherent viscosity and glass transition temperature were determined as in Example 3 and were found to be 0.33 and 144° C., respectively. This polymer was also soluble in methylene chloride and chloroform.

EXAMPLE 6

Polymerization of 1,1,3-Trimethyl-3-(4-hydroxymethylcyclohexyl)-5-hydroxymethylhexahydroindan, 1,4-Cyclohexanedimethanol and Dimethyl Terephthalate (0.25:0.75)

In a 200 ml. polymer flask equipped with a Vigreaux-Claissen adapter and nitrogen inlet tube were placed 23.16 g. (0.075 mole) of 1,1,3-trimethyl-3-(4-hydroxymethylcyclohexyl)-5-hydroxymethylhexahydroindan, 35.7 g. (0.248 mole) of 1,4-cyclohexanedimethanol, 58.2 g. (0.30 mole) of dimethyl terephthalate and a catalytic amount of dibutyl tin oxide. With nitrogen bubbling, the mixture was heated from 220° C. to 258° C. over a 1.5-hour period. The gas inlet was then removed and the mixture was stirred while the pressure was reduced to 1.0–5.5 mm. This vacuum was maintained for 2.1 hours after which an amber polymer was isolated. The inherent viscosity was 0.52 and the Tg was 108° C.

EXAMPLES 7 AND 8

Example 6 was repeated varying the fractions of reactants. The details are shown in Table II. The product of Example 7 was insoluble in both methylene chloride and chloroform.

TABLE II

| | Mole fraction in feed | | Inherent viscosity | Tg (° C.) |
|---|---|---|---|---|
| | n | m | | |
| Example: | | | | |
| 7 | 0.125 | 0.875 | 0.50 | 101 |
| 8 | 0.50 | 0.50 | 0.49 | 135 |

EXAMPLE 9

Polymerization of 1,1,3-Trimethyl-3-(4-hydroxymethylcyclohexyl)-5-hydroxymethylhexahydroindan, Ethylene Glycol and Dimethyl Terephthalate 0.25:0.75

In a 50 ml. polymer flask fitted with a Vigreaux-Claissen adapter and nitrogen inlet tube were placed 7.71 g. (0.025 mole) of 1,1,3-trimethyl-3-(4-hydroxymethyl-cyclohexyl) - 5 - hydroxymethylhexahydroindan, 9.3 g. (0.150 mole) of ethylene glycol, 19.4 g. (0.100 mole) of dimethyl terephthalate and a catalytic amount of dibutyl tin oxide. The mixture was heated for 2.7 hours, during which time the temperature was increased from 218° C. to 270° C., and nitrogen was bubbled therethrough. Then, the addition tube was removed and, with stirring, a vacuum of 0.80 mm. was applied for 1.8 hours while a temperature of 270° C. was maintained. An amber polymer was then isolated. The inherent viscosity was 0.51 and the Tg was 101° C. This product partly dissolved and partly crystallized in methylene chloride. It was soluble in chloroform.

EXAMPLES 10 AND 11

Example 9 was repeated varying the mole fractions of the reactants. The details are shown in Table III. The product of Example 10 gelled and crystallized in methylene chloride and crystallized in chloroform.

TABLE III

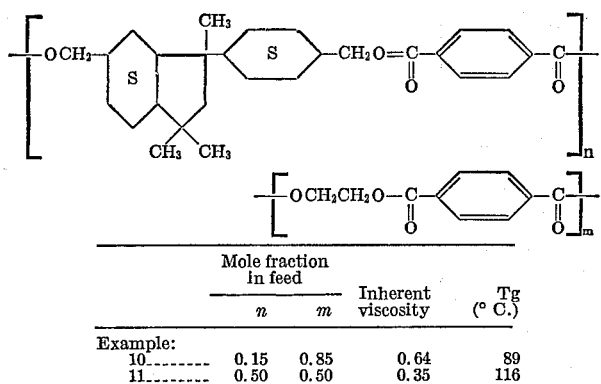

| | Mole fraction in feed | | Inherent viscosity | Tg (° C.) |
|---|---|---|---|---|
| | $n$ | $m$ | | |
| Example: | | | | |
| 10 | 0.15 | 0.85 | 0.64 | 89 |
| 11 | 0.50 | 0.50 | 0.35 | 116 |

EXAMPLE 12

A solution of 5.0 g. of the copolymer of Example 8 in 50 ml. of chloroform was prepared, filtered and concentrated to ½ volume. This dope was then cast onto a Teflon spray-coated glass plate at 25° C. The temperature of the plate was gradually raised to 60° C. over a 2.5-hour period and this 60° C. temperature was maintained for 18.5 hours. A clear, amorphous self-supporting film resulted.

EXAMPLE 13

A strip of film from Example 12 was treated with an activated gas by the process of Example IV of Belgian Pat. 736,993 for about five seconds using nitrogen trioxide as both the activator and reactive gases. The strip was then coated with a conventional gelatin-silver halide emulsion, dried and subjected to the "Cellophane Tape Test." According to this test, the dry emulsion layer is scored in a cross-hatch pattern and a piece of cellephane tape is pressed firmly over the cross-hatched area. The tape is then stripped quickly from the film. If the bond between the emulsion layer and the support is strong, the emulsion layer will not be removed by the tape. The system of this example passed this test.

EXAMPLE 14

Polymerization of 1,1,3-Trimethyl-3-(4-hydroxymethyl-cyclohexyl) - 5 - hydroxymethylhexahydroindan and Methylenedi-p-phenyl-Diisocyanate A solution of 6.17 g. (0.02 mole) of 1,1,3-trimethyl-3-(4 - hydroxymethylcyclohexyl)-5-hydroxymethylhexahydroindan, 5.00 g. (0.02 mole) of methylenedi-p-phenyl diisocyanate and a catalytic amount of dibutyl tin oxide in 125 ml. of o-dichlorobenzene was heated at approximately 85° C. for 1.67 hours. The polymer which formed precipitated from solution. The mixture was poured into 1500 ml. of methanol and the polymer was allowed to harden, whereupon it was isolated and dried in a vacuum oven. The inherent viscosity and the glass transition temperature were determined by the procedures of Example 3 and were found to be 0.37 and 97° C., respectively.

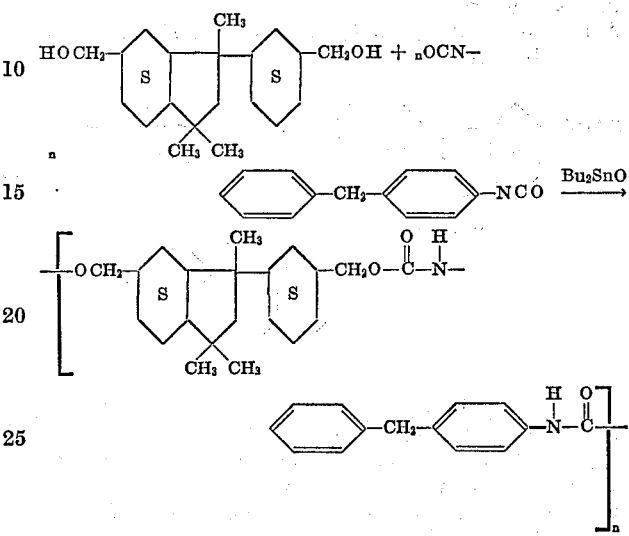

EXAMPLES 15

Example 14 was repeated except that tolylene-2,4-diisocyanate was substituted on an equimolar basis for the methylenedi-p-phenyl diisocyanate employed therein. The inherent viscosity of this polymer was 0.14 and the glass transition temperature was 147° C.

Generally, the film-forming materials of this invention can be solvent-cast or melt-extruded into sheets or films as useful flexible supports which can be utilized in various layer arrangements and structural combinations. Generally, the flexible supports of this invention are treated by any convenient method to improve the adhesion of superimposed coatings or layers. Useful procedures include sub-coating with either aqueous subbing systems, such as latexes or with organic subbing systems comprising solvent-soluble polymers in aqueous or organic solvents or in solvent mixtures, contacting with a chemical agent, such as sulfuric acid, electron bombardment and the like.

Films prepared from the linear condensation polymers of this invention are useful as flexible supports for photographic silver halide emulsions and other light-sensitive systems that do not contain silver halides. Polymeric films, according to this invention, are also desirable as supports for multilayer elements used in color photography and in diffusion transfer processes.

Film supports prepared from polymers of this invention are compatible with a wide variety of materials employed as binding agents in photographic silver halide emulsions. Useful binding agents include gelatin, synthetic polymeric compounds, such as dispersed vinyl compounds, such as in latex form and mixtures of gelatin and other synthetic polymeric compounds. The polymers of this invention find further use as supports for light-sensitive colloid layers such as are used in image transfer processes, in lithography, and the like. The dimensional stability of the subject polymers make them suitable as supports for photoresists such as those utilized in the preparation of printed circuits, and the like.

Polymeric compositions, according to this invention, are advantageously prepared by standard techniques using well-known industrial processes. The compounds employed in making the polymers of this invention are prepared from readily available, inexpensive materials. A further advantage of the polymers of this invention is that they may be readily formed into film using procedures consistent with commercially available equipment.

United States Application Ser. No. 180,114 filed September 13, 1971 of Wilson, now abandoned, discloses hydroxymethyl-substituted phenylindans and polymers thereof and the preparation of these condensants and polymers.

The invention has been described in detail with particular reference to preferred embodiments thereof, but it will be understood that variations and modifications can be effected within the spirit and scope of the invention.

What is claimed is:

1. A film forming polyurethane comprising a polymer having the structure:

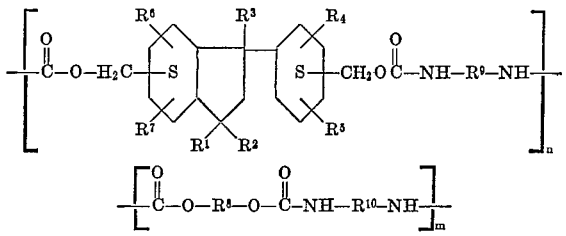

wherein;

$n$ is a mole fraction and is a positive number less than or equal to 1;

$m$ is a mole fraction and equals $1 - n$;

$R^1$ and $R^3$ are independently selected from the group consisting of hydrogen and alkyl radicals, of from 1 to 6 carbon atoms;

$R^2$ is an alkyl radical from 1 to 6 carbon atoms;

$R^4$, $R^5$, $R^6$ and $R^7$ are independently selected from the group consisting of hydrogen, aryl radicals, halogen atoms, nitro radicals, cyano radicals, amino radicals, and alkoxy radicals;

$R^8$, $R^9$ and $R^{10}$ are independently selected from the group consisting of alkylene radicals of from 2 to 10 carbon atoms, arylene radicals, arylenebisalkylene radicals wherein the alklylene portion has 1 to 6 carbon atoms, cycloalkylene radicals, alkylenebisarylene radicals wherein the alkylene portion contains 1 to 12 carbon atoms, alkylidenebisarylene radicals wherein the alkylidene portion contains 1 to 12 carbon atoms, arylenealkylene radicals; units having the formula:

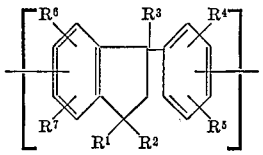

and the units having the formula:

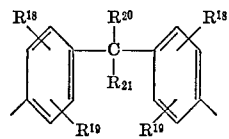

wherein $R^{18}$ and $R^{19}$ are independently selected from the group consisting of hydrogen atoms, aryl radicals, halogen atoms, nitro radicals, amino radicals, cyano radicals and alkoxy radicals and $R^{20}$ and $R^{21}$ are independently selected from the group consisting of hydrogen atoms, alkyl radicals, of from 1 to 16 carbon atoms, cycloalkyl radicals of from 4 to 6 carbon atoms, aryl radicals having from 6 to 20 carbon atoms and wherein $R^{20}$ and $R^{21}$ taken together with the carbon atom to which they are attached can represent a monocyclic, polycyclic or heterocyclic moiety having from 4 to 15 atoms in the ring system.

2. The composition of Claim 1 wherein $R^1$, $R^2$, and $R^3$ are methyl radicals.

3. The composition of Claim 1 wherein $R^4$, $R^5$, $R^6$ and $R^7$ are hydrogen atoms.

4. The composition of Claim 2 wherein $R^9$ is

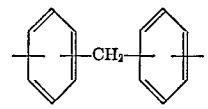

5. The composition of Claim 2 wherein $R^9$ is

References Cited
UNITED STATES PATENTS 3,085,993  4/1963  Peter et al. _____ 260—77.5 AP
3,640,965  2/1972  Brode et al. ____ 260—77.5 AP M. J. WELSH, Primary Examiner U.S. Cl. X.R.

260—75 R, 77.5 AQ, 77.5 B

UNITED STATES PATENT AND TRADEMARK OFFICE
CERTIFICATE OF CORRECTION

PATENT NO. : 3,842,042
DATED : October 15, 1974
INVENTOR(S) : John C. Wilson and Frederick L. Hamb It is certified that error appears in the above-identified patent and that said Letters Patent are hereby corrected as shown below:

Column 2, line 21, "2,873,362" should read ---2,873,262---.

Column 2, line 45, the formula should read

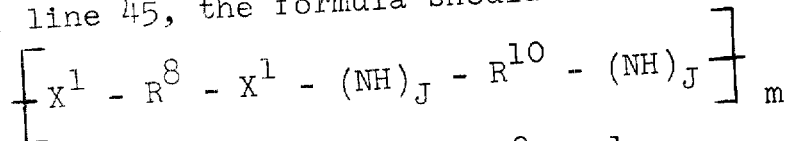

Column 2, line 71, after " $-X^1 - R^8 - X^1-$ " insert ---and J are---.

Column 3, line 54, "their" should read ---either---.

Column 3, line 75, after "such" insert ---as---.

Column 5, lines 60-64, the structure should read

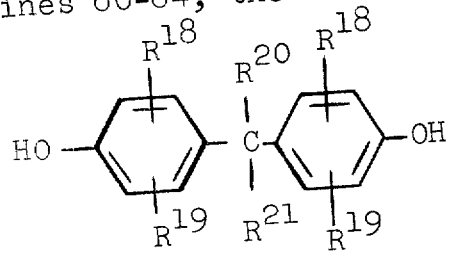

Page 2

UNITED STATES PATENT AND TRADEMARK OFFICE
CERTIFICATE OF CORRECTION

PATENT NO. : 3,842,042
DATED : October 15, 1974
INVENTOR(S) : John C. Wilson and Frederick L. Hamb It is certified that error appears in the above-identified patent and that said Letters Patent are hereby corrected as shown below:

Column 8, lines 2-3, that part of the formula reading "(4-chabomethoxycyclohexyl)-5-carbomethoxyhexadhydroindan" should read --- (4-carbomethoxycyclohexyl)-5-carbomethoxyhexahydroindan ---.

Column 8, line 39, "anaylsis" should read ---analysis---.

Column 9, lines 40-41, that part of the formula reading "(4-carbomethoxycyclohexy)" should read --- (4-carbomethoxycyclohexyl) ---.

Column 9, line 66, that part of the formula reading "$Zn(OAc) \cdot 2H_2O$" should read --- $Zn(OAc)_2 \cdot 2H_2O$ ---.

Column 10, line 15, "methylcyclohexyl)15lhydroxymethylhexahydroindan" should read --- methylcyclohexyl)-5-hydroxymethylhexahydroindan ---.

Column 11, line 59, "cellephane" should read ---cellophane---.

Column 13, line 41, "alklylene" should read ---alkylene---.

Signed and sealed this 15th day of July 1975.

(SEAL)
Attest:

RUTH C. MASON
Attesting Officer

C. MARSHALL DANN
Commissioner of Patents
and Trademarks